United States Patent Office 3,580,866
Patented May 25, 1971

3,580,866
PROCESS FOR PRODUCING HIGH MOLECULAR WEIGHT POLYMERS OF ALKYLENE OXIDES
Teruhiko Ito, Naoshi Mitsui, Seiichiro Maeda, and Takeshi Kato, Kakogawa-shi, Japan, assignors to Seitetsu Kagaku Co., Ltd., Hyogo-ken, Japan
No Drawing. Filed Oct. 27, 1967, Ser. No. 678,516
Int. Cl. C08f 7/12
U.S. Cl. 260—2
41 Claims

ABSTRACT OF THE DISCLOSURE

A process for producing a high molecular weight polymer of an alkylene oxide which comprises contacting an alkylene oxide with a novel catalyst at a temperature of from −50° C. to +150° C., said catalyst being prepared by partially hydrolyzing an aluminum alkoxide with water in an amount of 0.01 to 2.8 moles per mole of the alkoxide in a liquid, inert medium and mixing the resulting partial hydrolyzate with an organo-metallic compound of a metal of Group II or III of the Periodic Table in an amount of 0.001 to 2.5 moles per mole of the starting aluminum alkoxide. When the above polymerization is effected in the presence of a tertiary amine, the polymerization degree is increased.

The present invention relates to a process for polymerizing an alkylene oxide. More particularly, the invention concerns a process for producing a high molecular weight polymer with a novel catalyst prepared by partially hydrolyzing an aluminum alkoxide with water in an amount of not more than 2.8 moles per mole of the alkoxide and mixing the resulting partial hydrolyzate with an organo-metallic compound of a metal of Group II or III of the Periodic Table.

An alkylene oxide polymer can be used as a dispersant for making paper, a thickening agent, a flocculant for suspended fine particles, a water-soluble film, a sizing agent for fibers and the like and hence is very useful in industry. Particularly, an alkylene oxide polymer having a high degree of polymerization can generally be effective to said uses in a smaller amount, and therefore, it has a high commercial value. The present invention is to provide a process for producing an alkylene oxide polymer having a high molecular weight suitable for such uses. The term "intrinsic viscosity" or "[η]" used herein as a measure for the degree of polymerization refers to a value measured at 35° C. in an aqueous solution in the case of ethylene oxide polymer and to a value measured at 30° C. in a benzene solution in the case of the other alkylene oxides.

Japanese Pat. No. 409,556 (publication No. 2,748/63) discloses the use of a partially hydrolyzed aluminum alkoxide alone, which is a reaction product of an aluminum alkoxide and water, in the production of an alkylene oxide polymer, and U.S. Pat. No. 2,870,100 discloses that an organometallic compound of a metal of Group II or III of the Periodic Table can be used alone to polymerize an alkylene oxide.

However, where ethylene oxide is polymerized with a partially hydrolyzed aluminum alkoxide alone as a catalyst, the produced polymer has only an intrinsic viscosity of about 5 even when the polymerization is effected under the optimum conditions for a long period of time, and the polymerization velocity is not so high as to be suited to the production of the polymer on a commercial scale. Moreover, where ethylene oxide is subjected to polymerization with an organometallic compound of a metal of Group II or III of the Periodic Table alone as a catalyst, no polymer having an intrinsic viscosity exceeding 2 is produced, except for the case of an organomagnesium compound, and the polymerization velocity is very low. With an organomagnesium compound, the produced ethylene oxide polymer has often an intrinsic viscosity exceeding 10, and, in some cases, of about 20. However, it takes a very long time to reach such a high degree of polymerization, and hence the use of said organometallic compound alone is not considered to be valuable in industry.

An object of the present invention is to provide a process for producing a high molecular weight alkylene oxide polymer at a high rate on a commercial scale. Another object of the present invention is to provide a novel catalyst suitable for the production of said polymer. A further object of the present invention is to provide an alkylene oxide polymer having a very high degree of polymerization and hence having a high utility.

The present inventors have conducted extensive research in order to accomplish the above-mentioned objects and have consequently found that a catalyst composition consisting of a reaction product of a partially hydrolyzed aluminum alkoxide and an organometallic compound of a metal of Group II or III of the Periodic Table can produce a high molecular weight alkylene oxide polymer at a very high polymerization velocity and that the yield of the polymer per unit amount of the catalyst is extremely enhanced as compared with that in the abovementioned prior processes. Furthermore, in the present polymerization process, the use of a tertiary amine has been found to result in the great increase of the polymerization degree of the produced polymer. According to the present invention, there is provided a process for producing a high molecular weight alkylene oxide polymer, which comprises contacting an alkylene oxide with a catalyst in an amount of 0.0001 to 0.3 mole as the aluminum contained therein per mole of the charged alkylene oxide monomer at a temperature of −50° C. to +150° C., said catalyst being prepared by dispersing or dissolving an aluminum alkoxide in a liquid, inert medium, adding thereto water in an amount of 0.01 to 2.8 moles per mole of the alkoxide, reacting the two at a temperature of −50° C. to +300° C. to produce a partially hydrolyzed aluminum alkoxide, distilling off, if necessary, the alcohol produced as the by-product, and reacting said partial hydrolyzate with at least one organometallic compound of a metal of Group II or III of the Periodic Table in a proportion of 0.001 to 2.5 moles per mole of the starting aluminum alkoxide at a temperature of −50° C. to +300° C.

The partially hydrolyzed aluminum alkoxide used as one component of the catalyst of the present invention may conventionally be prepared in the following manner. An aluminum alkoxide having the formula:

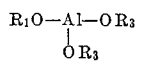

wherein $R_1$, $R_2$ and $R_3$ each are saturated aliphatic hydrocarbon residues having 1 to 6 carbon atoms, such as methyl, ethyl, n-propyl, n-butyl, isobutyl, n-pentyl, isopentyl, n-hexyl, isopropyl, sec.-butyl, tert.-butyl, tert.-pentyl, cyclohexyl and the like, including, for example, aluminum trimethoxide, aluminum triethoxide, aluminum triisopropoxide, aluminum mono - sec. - butoxy-diisopropoxide, aluminum tri-sec.-butoxide and the like, is dispersed or dissolved in a liquid, inert medium, water is added thereto in a proportion of 0.01 to 2.8 moles, preferably 0.1 to 2.5 moles, more preferably 0.4 to 2.0 moles, per mole of the aluminum alkoxide and the two components are then subjected to reaction at a temperature of —50° to +300° C., preferably 0° to 200° C. to produce a partially hydrolyzed aluminum alkoxide.

The inert medium used in the above-mentioned reaction is at least one member selected from the group consisting of aromatic hydrocarbons, such as benzene, toluene, xylene, mesitylene, ethylbenzene, diethylbenzene, propylbenzene and the like; saturated aliphatic hydrocarbons, such as n-pentane, isopentane, n-hexane, isohexane, 3-methylpentane, 2,3-dimethylbutane, n-heptane, 2,2-dimethylpentane, 2-methylhexane, 3-methylhexane, n-octane, isooctane, n-nonane, cyclobutane, cyclopentane, cyclohexane, cycloheptane, cyclooctane, cyclononane, Decalin and the like; ethers, such as diethyl ether, di-n-propyl ether, diisopropyl ether, di-n-butyl ether, diisobutyl ether, di-sec.-butyl ether, ethyl isopropyl ether, diethylene glycol diethyl ether, anisole, phenetole, diphenyl ether, tetrahydrofuran, 1,4-dioxane, 1,3-dioxane, ethylene glycol dimethyl ether, propylene glycol dimethyl ether, diethylene glycol diethyl ether, ethylene glycol diethyl ether and the like, and the medium is liquid under the conditions for preparing the partial hydrolyzate of aluminum alkoxide.

The reaction of an aluminum alkoxide with water can be effected by adding the two to an inert medium in an amount of more than 0.1 times, preferably 1 to 200 times the volume of the aluminum alkoxide and mixing the resulting mixture. In general, water may be added to the medium in which the aluminum alkoxide is dissolved or dispersed, while stirring the medium, and, if necessary, stirring may be further continued. The temperature for said reaction ranges from —50° C. to +300° C., preferably from 0° C. to 200° C., and the higher the temperature, the shorter the reaction time can be made. The time required for said reaction is generally about 0.1 to 10 hours. Further, said reaction may be effected under pressure or under reduced pressure, and the pressure is not critical.

In said partial hydrolyzation, there may be added at least one additive selected from the group consisting of aliphatic alcohols having 1 to 6 carbon atoms, such as methanol, ethanol, n-propanol, isopropanol, n-butanol, isobutanol, sec.-butanol, n-pentanol, n-hexanol, allyl alcohol, ethylene glycol and the like; aliphatic ketones having 3 to 13 carbon atoms, such as acetone, methyl ethyl ketone, diethyl ketone, methyl isopropyl ketone, methyl isobutyl ketone, diisopropyl ketone, di-n-butyl ketone, di-n-hexyl ketone and the like; amines having at least one hydrocarbon residue of 1 to 6 carbon atoms attached to the nitrogen atom, such as methylamine, dimethyl amine, trimethyl amine, ethyl amine, diethyl amine, triethyl amine, n-propyl amine, di-n-propylamine, tri-n-propyl amine, isopropyl amine, diisopropyl amine, triisopropyl amine, tri-n-hexyl amine, allyl amine, N-methylaniline N,N-dimethylaniline, N,N-diethylaniline and the like; and 1,4-dioxane, whereby the effect on polymerization of the resulting catalyst can be controlled. For example, when a high molecular weight polymer of ethylene oxide is desired in the polymerization of ethylene oxide in n-hexane in the presence, as a catalyst, of a reaction product of a partially hydrolyzed aluminum triisopropoxide and diethylzinc, methanol, is preferably added to the medium for the partial hydrolyzation. Further, when a somewhat lower molecular weight polymer of ethylene oxide is desired in said polymerization, acetone or isopropanol should be added, and ethanol and acetone or isopropanol should be added when an ethylene oxide polymer having a high apparent density and an ethylene oxide polymer having a low apparent density are desired in said polymerization, respectively. Moreover, in the polymerization of propylene oxide, the addition of the above-mentioned additive enables the change of the crystallinity of the produced polymer. When the above-mentioned hydrocarbon is used as the medium for the above-mentioned hydrolyzation, the ether illustrated above as the medium may also be used as the additive. Said additive and water may separately be added to the medium containing dispersed or dissolved therein the aluminum alkoxide or may often be added in admixture, because most of the additive is compatible with water. When the inert medium is not hydrophic, such as hydrocarbons, it is difficult to uniformly contact the aluminum alkoxide with water in said medium. Therefore, it is often advantageous to gradually add the water diluted with a water-compatible alcohol, ketone, amine or ether to the medium or to blow a mixture of water vapor and an inert gas, such as nitrogen or argon into the medium. The amount of the additive used ranges generally from 0.01 to 20 moles per mole of the aluminum alkoxide.

The partial hydrolyzate of aluminum alkoxide produced by said reaction is dispersed or dissolved in the inert medium containing the alcohol formed as the by-product and, if added, an additive. The alcohol by-product and the alcohol, primary amine and secondary amine used as the additive can react with the organometallic compound to be subsequently used for the preparation of the catalyst and adversely affect the polymerization of alkylene oxide with the catalyst, as, for example, result in the reduction of both the polymerization velocity and the degree of polymerization of the produced polymer. Therefore, in the usual procedure, said by-product and additive are distilled off together with a part of the inert medium immediately after the production of the partial hydrolyzate. The amount of the remaining by-product and additive may be about equimolar to the aluminum alkoxide used, though it is preferably as small as possible. The thus obtained partial hydrolyzate of aluminum alkoxide may be used in the reaction with an organometallic compound in the form of a solution or dispersion in the inert medium or after the removal of the inert medium.

The thus partially hydrolyzed aluminum alkoxide is supposed to be a kind of inorganic polymer having >Al—O—Al< linkages, though the exact structure thereof has not been confirmed. In any event, said partial hydrolyzate is clearly different from alumina, since, when ethylene oxide is subjected to polymerization with said partial hydrolyzate alone under the optimum condition, the produced polymer has an intrinsic viscosity of about 5, while when alumina is used, a polymer having an intrinsic viscosity of less than 1 is produced even under the optimum conditions.

The organometallic compound of the Group II or III metal used in the present invention is a compound of the formula:

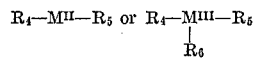

wherein $M^{II}$ is a metal of Group II of the Periodic Table, such as beryllium, magnesium, calcium, stronium, barium, zinc, cadmium or mercury; $M^{III}$ is a metal of Group III of the Periodic Table, such as boron or aluminum; and $R_4$, $R_5$ and $R_6$ each are hydrocarbon residues having 1 to 6 carbon atoms, or a complex of said compounds. Typical examples of the above organometallic compound are dimethylmagnesium, diethylmagnesium, di-n-propylmagnesium, diisopropylmagnesium, di-n-butylmagnesium, diisobutylmagnesium, ethyl-n-propylmagnesium, ethyl-isopropylmagnesium, ethylisobutylmagnesium, dicyclohexylmagnesium, diphenylmagnesium, and those compounds in which other Group II metals are substituted for the magnesium of said compounds; and trimethylaluminum, triethylaluminum, tri-n-propylaluminum, triisopropylaluminum, tri-n-butylaluminum, triisobutylaluminum, dimethyl-ethylaluminum, methyl-diethylaluminum, diethyl-n-propylaluminum, ethyl-di-n-propylaluminum, diethylisobutylaluminum, ethyl - diisobutylaluminum, methylethyl-isobutylaluminum, tricyclohexylaluminum, triphenylaluminum and those compounds in which boron is substituted for the aluminum of said compounds. Examples of the said complex are calcium tetramethylzinc, calcium tetraethylzinc, calcium tetrapropylzinc, calcium tetrabutylzinc, calcium dimethyl - diethylzinc, calcium diethyl-dibutylzinc, strontium tetraethylzinc, strontium tetrabutylzinc, barium tetraethylzinc, barium, tetrabutylzinc, and those compounds in which cadmium or mercury is substituted for the zinc of said compounds; magnesium pentamethylboron, magnesium pentaethylboron, magnesium pentamethylaluminum, magnesium pentaethylaluminum, magnesium pentabutylaluminum, and those compounds in which calcium, strontium, zinc or cadmium is substituted for the magnesium of said compounds.

The present catalyst is prepared by mixing the above-mentioned partial hydrolyzate of aluminum alkoxide with at least one of the above-mentioned organometallic compounds in a proportion of 0.001 to 2.5 moles, preferably 0.01 to 1.0 mole, per mole of the aluminum alkoxide in any desired manner, and subjecting the resulting mixture to reaction at a temperature of from $-50°$ C. to $+300°$ C. for a period of from 0.1 to 30 hours, preferably at $40°$ to $200°$ C. for 0.1 to 10 hours. It is usually preferable and convenient to mix the two components in a liquid, inert medium. Particularly, it is often preferable to add the organometallic compound to the solution or dispersion of the partially hydrolyzed aluminum alkoxide in the inert medium obtained in the partial hydrolyzate preparation step. Further, since the catalyst-preparation reaction often proceeds considerably rapidly even under normal conditions, such as at room temperature and under atmospheric pressure, the two components may simply be mixed together with a monomer to be polymerized in a polymerization medium just before the polymerization, whereby the monomer can be polymerized. Moreover, the two components may be mixed in an alkylene oxide monomer or may directly be mixed with each other. The thus prepared catalyst is suitable for bulk-polymerization of an alkylene oxide. The reaction of said two components may be effected under pressure or under reduced pressure. That is, the pressure is not critical to said reaction. However, it is often advantageous to conduct the reaction under pressure when it is desired to effect the reaction at a high temperature in a low-boiling medium.

The medium which may be used to prepare the catalyst may be any of the mediums for the preparation of the partial hydrolyzate of aluminum alkoxide. The amount of the medium used may be substantially the same as in the preparation of the partial hydrolyzate.

The activity of the prepared catalyst can be improved by previously heating the partial hydrolyzate at a temperature of from $40°$ to $300°$ C. for a period of 0.1 to 30 hours prior to mixing with the organometallic compound. That is, the use of the thus pre-heated partial hydrolyzate enables the enhancement of the polymerization velocity and the polymerization degree in the polymerization of alkylene oxides with the catalyst derived from said partial hydrolyzate and the organometallic compound. Further, the crystallinity of the produced polymer can thereby be varied. Said pre-heating is preferably applied to the dispersion or solution of the partial hydrolyzate in the inert medium from which the materials affecting adversely the subsequent reactions, for example, the alcohol by-product and the like, have been distilled off. The higher the pre-heating temperature, the shorter the pre-heating time can be made. However, when the pre-heating is carried out at a temperature higher than $300°$ C., the polymerization velocity tends to be lowered. Furthermore, at less than $40°$ C., a very long period of time is required for said pre-heating, and hence such a pre-heating is not commercially valuable. It is particularly preferable to select a pre-heating temperature ranging from $80°$ to $200°$ C.

In the present process, an alkylene oxide is polymerized with the thus prepared catalyst usually in an inert medium in a conventional manner, though the alkylene oxide may be subjected to bulk-polymerization with the catalyst in the absence of the medium. As said medium for polymerization, there may be used any of the mediums illustrated hereinbefore as the mediums for the preparation of the partial hydrolyzate. Almost all of the mediums for polymerization can be classified into two groups, one of which can dissolve both alkylene oxide monomer and polymer, and the other can dissolve the monomer but cannot dissolve the polymer. For instance, speaking of the polymerization of ethylene oxide, aromatic hydrocarbons and ethers except dialkyl ethers belong to the former group, and saturated aliphatic hydrocarbons and dialkyl ethers to the latter group. In the present invention, it is often preferable to use the mediums belonging to the latter group, because the polymer is obtained in the form of granules and hence the separation and recovery of the produced polymer can be facilitated. A mixture of the two group mediums may, of course, be used, though it is desired that the mediums be combined so that the same effect as the latter group medium can be attained.

The polymerization reaction in the present process may be conducted in the above-mentioned inert medium in the presence of the catalyst in a proportion of 0.0001 to 0.3 mole, as aluminum, per mole of the charged alkylene oxide monomer at a temperature of $-50°$ C. to $+150°$ C. under any desired pressure. Generally speaking, the higher the polymerization temperature, the higher the polymerization velocity becomes, and a low temperature is desired to produce a high molecular weight polymer. At a polymerization temperature of less than $-50°$ C., the polymerization velocity is too low, and above $150°$ C., the produced polymer tends to be decomposed.

In the polymerization of an alkylene oxide according to the present process, the presence of a tertiary amine having at least one hydrocarbon residue of 1 to 6 carbon atoms attached to the nitrogen atom results often in the increase of the polymerization degree of the produced polymer. Examples of said amine are trimethyl amine, triethyl amine, tri-n-propyl amine, triisopropyl amine, tri-n-butyl amine, triisobutyl amine, tri-sec.-butyl amine, tri-n-amyl amine, triisoamyl amine, triallyl amine, methyl diethyl amine, n-propyl dimethyl amine, cetyl dimethyl amine, methyl ethyl n-propyl amine, tricyclohexyl amine, methyl dicyclohexyl amine, dimethyl cyclohexyl amine, methyl ethyl cyclohexyl amine, diethyl cyclohexyl amine, N,N-dimethylaniline, N,N-diethylaniline, triphenyl amine, N-ethyl-N-benzylaniline, N,N,N′,N′-tetraethyl ethylenediamine, N,N,N′,N′-tetramethyl phenylenediamine, N,N,N′,N′-tetramethylbenzidine, N-methylmorpholine, N-ethylmorpholine, N-phenylmorpholine, N-methylphenothiazine, pyridine and the like.

The said tertiary amine is effective in an amount as small as 0.001 mole per mole of the aluminum in the catalyst. Even if the tertiary amine used in an amount exceeding 10 moles per mole of the aluminum, the effect thereof is not enhanced. The particularly preferable amount of the tertiary amine added ranges from 0.01 to 5 moles per mole of the aluminum. It is also possible to control the degree of polymerization of the produced polymer by varying the kind and amount of the tertiary amine. The addition of the tertiary amine to the polymerization system may be before, simultaneous with or after the initiation of polymerization. If desired, the tertiary amine may be added in the preparation of the partial hydrolyzate or the preparation of the catalyst by the reaction of the partial hydrolyzate with the organometallic compound.

The alkylene oxide used in the present invention is a compound represented by the formula:

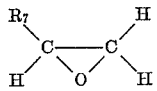

wherein $R_7$ is a hydrogen atom or a methyl, ethyl, phenyl, vinyl, chloromethyl, bromomethyl, methoxymethyl, allyloxymethyl or phenoxymethyl group. Examples of said alkylene oxide are ethylene oxide, propylene oxide, 1,2-epoxybutane, epichlorohydrin, epibromohydrin, methyl glycidyl ether, phenyl glycidyl ether, butadiene monoxide, allyl glycidyl ether, styrene oxide and the like.

According to the present process, a homopolymer and a copolymer can advantageously be produced from at least one of said alkylene oxides. According to the present invention, not only the degree of polymerization of the produced polymer of alkylene oxide can be enhanced, but the crystallinity of the polymer can also be improved. In addition, the reaction time can be shortened as compared with the prior polymerization process, and in some cases, the control of the polymerization reaction can be facilitated by suitably selecting the heating conditions for preparing the catalyst, the combination of the starting materials for catalyst, and the tertiary amine, whereby a polymer having the desired degree of polymerization can be produced in a given period of time.

Thus, it is quite unexpected that the combination catalyst of the partially hydrolyzed aluminum alkoxide and the organometallic compound of a metal of Group II or III of the Periodic Table, which have only a low polymerization ability when each is used alone, industrially advantageously produces an alkylene oxide polymer which is useful as flocculant, thickening agent and sizing agent, particularly a high molecular weight polymer of alkylene oxide which has not been produced by the use of said catalyst components alone.

EXAMPLE 1

The air in a 800-ml. glass vessel equipped with a reflux condenser, a thermometer and a stirrer was replaced with nitrogen, and a solution of 0.03 mole of aluminum triisopropoxide in 80 ml. of Decalin was then charged into the vessel. The solution was gradually heated to 80° C. while being stirred, at which 0.024 mole of water diluted with 50 ml. of isopropanol was slowly charged into the vessel in two hours while stirring violently and thereafter the resulting mixture was heated under reflux for three hours while being stirred. 50 ml. of n-heptane was added to the resulting system containing the partial hydrolyzate of aluminum triisopropoxide formed by said reaction, and the resulting mixture was heated to the boiling point of n-heptane to distill off the fractions having boiling points lower than the boiling point of n-heptane, that is n-heptane containing both the alcohol produced as the by-product in said reaction and the alcohol added as the additive. To the remaining liquid was added 0.03 mole of diethylzinc and an amine additive (only in No. 4 in Table 1), and the resulting mixture was stirred at 80° C. for one hour. Thereafter, 400 ml. of n-heptane was added thereto again and the whole was maintained at 70° C. while continuing stirring, and ethylene oxide was blown thereinto for 4 hours to effect polymerization of the ethylene oxide. The feed rate of ethylene oxide was controlled so that a small amount of ethylene oxide was always caused to flow out of the outlet of the vessel, whereby the reaction system was always saturated with ethylene oxide under atmospheric pressure.

The results obtained are as shown in Table 1, in which the example of the use of alumina substituted for the partial hydrolyzate is also shown for comparison.

TABLE 1

| Number | Partial hydrolyzate Kind | Amount (mole) | Organometallic compound Kind | Amount (mole) | Additive Kind | Amount (mole) | Produced polymer Yield (g.) | [η] |
|---|---|---|---|---|---|---|---|---|
| 1 | Aluminum triisopropoxide | 0.03 | Diethylzinc | 0.03 | | | 60 | 4.0 |
| 2 | do | 0.03 | | | | | 45 | 1.9 |
| 3 | | | Diethylzinc | 0.03 | | | 0 | |
| 4 | Aluminum triisopropoxide | 0.03 | do | 0.03 | Triethylamine | 0.03 | 55 | 8.5 |
| 5 | Active alumina | 0.03 | do | 0.03 | | | 2 | |

EXAMPLE 2

The polymerization of ethylene oxide was conducted in the same manner as in Example 1, except that water was diluted with 1,4-dioxane, the alcohol produced as the by-product and contained in the partial hydrolyzate of aluminum triisopropoxide was not removed and di-n-butylzinc was substituted for the diethylzinc, to obtain 42 g. of a polymer having an intrinsic viscosity of 3.1. When 0.01 mole of N,N-diethylaniline was added during polymerization, 48 g. of a polymer having an intrinsic viscosity of 5.7 was obtained.

EXAMPLE 3

This example shows that various aluminum alkoxides can be used to polymerize ethylene oxide.

Into a 300-ml. four necked flask provided with a reflux condenser, a thermometer, a dropping funnel and a stirrer, after the substitution of nitrogen for the air in the flask, was charged a solution of 0.045 mole of an aluminum alkoxide in 150 ml. of gasoline for rubber (boiling point: 80°–120° C.) and then 0.045 mole of water diluted with 15 ml. of isopropanol was added dropwise thereto at 30° C. in 10 minutes with stirring. The resulting mixture was maintained at 30° C. for two hours while being stirred, and thereafter subjected to distillation to remove the alcohol formed as the by-product in the reaction of the aluminum alkoxide with water, and the isopropanol added as an additive. When the temperature of a still reached 102° C., the distillation was discontinued, immediately after which 0.0045 mole of diethylzinc was added to the remaining liquid, and the resulting mixture was maintained at a still temperature of 102° C. for 1 hour, under total reflux while being stirred, whereby a white suspension was obtained.

Into a 500-ml. separable flask with a stirrer in which nitrogen had previously been substituted for the air were charged 400 ml. of n-hexane, the above-mentioned suspension as a catalyst in an amount corresponding to 0.015 mole of the aluminum contained therein and 52 g. of ethylene oxide in this order. The resulting mixture was stirred at room temperature for 6 hours and then allowed to stand for 42 hours to effect polymerization. The results obtained are as shown in Table 2.

TABLE 2

| No. | Aluminum alkoxide | Polymer Yield (g.) | [η] |
|---|---|---|---|
| 1 | Aluminum trimethoxide | 41 | 11.2 |
| 2 | Aluminum triisopropoxide | 40 | 8.4 |
| 3 | Aluminum mono-sec.-butoxy-diisopropoxide | 39 | 11.5 |
| 4 | Aluminum tri-sec.-butoxide | 38 | 10.8 |

EXAMPLE 4

This example shows the effect on the produced polymer of the additive used in the preparation of the partially hydrolyzed aluminum alkoxide.

Into a 1.5 l. four-necked flask equipped with a reflux condenser, a thermometer, a dropping funnel and a stirrer, after the substitution of nitrogen for the air therein, was charged 0.25 mole of aluminum isopropoxide dissolved in a mixture of 470 ml. of gasoline for rubber (boiling point: 80°–120° C.) and 130 ml. of kerosene (boiling point: 158°–230° C.), and then 0.25 mole of water diluted with an additive was added dropwise thereto at 30° C. in one hour with violent stirring, after which the mixture was maintained at 30° C. for one hour while being stirred. The alcohol formed as the by-product in the reaction of the aluminum isopropoxide with the water and the additive were distilled off. The distillation was stopped when the still temperature reached 140° C., immediately after which 0.025 mole of diethylzinc was added thereto, and the mixture was heated at a still temperature of 140° C. for one hour under total reflux conditions while being stirred, whereby a white suspension was obtained.

Into a 10-l. enameled vessel with a stirrer in which nitrogen had previously been substituted for the air were charged 8 l. of n-hexane, the above-mentioned suspension and 1100 g. of ethylene oxide in this order. The resulting mixture was subjected polymerization at 25° C. for 40 hours with stirring. The results obtained are as shown in Table 3.

TABLE 3

| No. | Additive Kind | Amount (ml.) | Polymer Yield (g.) | [η] | Apparent density (g./ml.) |
|---|---|---|---|---|---|
| 1 | Methanol | 47 | 890 | 17.8 | 0.29 |
| 2 | Ethanol | 45 | 950 | 12.8 | 0.36 |
| 3 | do | 30 | 940 | 5.1 | 0.23 |
| 4 | Isopropanol | 30 | 920 | 9.6 | 0.22 |
| 5 | Acetone | 45 | 935 | 12.5 | 0.23 |
| 6 | {Methanol / Acetone} | 47 / 20 | 890 | 17.8 | 0.29 |
| 7 | {Methanol / Ethanol} | 47 / 20 | 1,050 | 18.4 | 0.48 |
| 8 | Dioxane | 30 | 950 | 8.5 | 0.25 |
| 9 | Ethyl ether [1] | 50 | 910 | 6.0 | 0.23 |
| 10 | n-Butyl amine | 50 | 850 | 16.8 | 0.30 |

[1] Separately added before addition of water.

EXAMPLE 5

This example relates to the temperature for the reaction of an aluminum alkoxide and water.

Ethylene oxide was polymerized in the same manner as in Example 3, except that aluminum triisopropoxide was used as the aluminum alkoxide, the hydrolyzation temperature was varied as shown in Table 4, the reaction was effected at 60° C. after addition of diethylzinc, the amount of ethylene oxide was 88 g., N,N-dimethylaniline (0.015 mole) was added together with the catalyst at the time of polymerization and the time for allowing the mixture to stand was 92 hours. The results obtained are as shown

TABLE 4

| Number | Temperature for reacting aluminum alkoxide with water (° C.) | Polymer Yield (g.) | [η] |
|---|---|---|---|
| 1 | 3–4 | 61 | 8.7 |
| 2 | 30 | 66 | 9.5 |
| 3 | 93 | 40 | 18.0 |

EXAMPLE 6

This example relates to the heat-treatment of the partially hydrolyzed aluminum alkoxide after the removal of the additive and the alcohol formed as the by-product.

115 g. of ethylene oxide was subjected to polymerization in the same manner as in Example 5, except that n-heptane was substituted for the gasoline for rubber, the amount of water was 0.036 mole, the hydrolyzation temperature was 30° C., a heat-treatment at about 107° C. was applied for a period as shown in Table 5 after distillation and before addition of diethylzinc, no heat-treatment was effected after addition of diethylzinc and the time for allowing the mixture to stand was 90 hours. The results obtained are as shown in Table 5.

TABLE 5

| Number | Heat-treatment time for partial hydrolyzate (hr.) | Polymer Yield (g.) | [η] |
|---|---|---|---|
| 1 | 3 | 32 | 15.8 |
| 2 | 10 | 33 | 15.0 |
| 3 | 20 | 34 | 15.0 |
| 4 | 24 | 35 | 18.0 |

EXAMPLE 7

Into the same reactor as in Example 1, after the substitution of nitrogen for the air therein, were charged 80 ml. of Decalin, 75 ml. of n-heptane and 0.06 mole of aluminum alkoxide. The resulting mixture was heated to 80° C. while being slowly stirred, and 0.048 mole of water diluted with 50 ml. of 1,4-dioxane was gradually added thereto at a temperature of 80° to 90° C. in two hours while violently stirring the mixture. The resulting mixture was further stirred for 2 hours under reflux, after which the alcohol formed as the by-product was distilled off. In order to make the removal of the alcohol complete, the distillation was continued for 5 minutes after the temperature of the mixture reached the boiling point of Decalin. The partial hydrolyzates of various aluminum alkoxides were all in the form of white, translucent jelly. To the jelly was added 240 ml. of n-heptane and the mixture was well shaken to form a uniform suspension.

The thus prepared suspension of the partially hydrolyzed aluminum alkoxide was charged into a 100-ml. glass vessel in an amount corresponding to 0.135 g. (0.005 mole) of the aluminum contained therein together with 20 ml. of ethylene oxide, an organometallic compound and a tertiary amine under a nitrogen atmosphere, and the mixture was then well shaken to form a uniform mixture which was then allowed to stand at −10° C. for 28 hours to polymerize the ethylene oxide (this method being hereinafter referred to as Method A).

The partially hydrolyzed aluminum alkoxide was reacted with an organometallic compound at 80° C. for one hour before being mixed with n-heptane, and then the reaction product was applied to polymerization in the same manner as in Method A (this method being hereinafter referred to as Method B).

The results obtained are as shown in Table 6, in which diethylmagnesium and dimethylmagnesium were used in the form of solutions in 0.3 ml. of diethyl ether, and calcium tetraethylzinc and triethylaluminum were used in the form of solutions in 3 ml. of benzene and 0.3 ml. of n-heptane, respectively.

TABLE 6

| Number | Aluminum alkoxide Kind | Amount (mole) | Organometallic compound Kind | Amount (mole) | Tert.-amine Kind | Amount (mole) | Preparation of catalyst | Produced polymer Yield, percent | [η] |
|---|---|---|---|---|---|---|---|---|---|
| 1 | Aluminum tri-isopropoxide. | 0.005 | Diethylmagnesium | 0.00125 | | | A | 56 | 10.3 |
| 2 | do | 0.005 | do | 0.00125 | N,N-dimethylaniline | 0.0015 | A | 63 | 24.0 |
| 3 | do | 0.005 | | | | | | 36 | 4.7 |
| 4 | | | Diethylmagnesium | 0.00125 | | | | 0 | |
| 5 | Aluminum tri-isopropoxide. | 0.005 | do | 0.00125 | | | B | 73 | 8.6 |
| 6 | do | 0.005 | do | 0.00125 | N,N-dimethylaniline | 0.0015 | B | 67 | 15.5 |
| 7 | do | 0.005 | Dimethylcadmium | 0.0005 | | | A | 42 | 11.2 |
| 8 | do | 0.005 | do | 0.0005 | N,N-dimethylaniline | 0.0015 | A | 46 | 19.3 |
| 9 | do | 0.005 | Calcium tetraethylzinc | 0.001 | | | A | 48 | 10.8 |
| 10 | do | 0.005 | do | 0.001 | N,N-dimethylaniline | 0.0015 | A | 49 | 20.6 |
| 11 | do | 0.005 | Triethylaluminum | 0.001 | | | A | 52 | 7.8 |
| 12 | do | 0.005 | do | 0.001 | N,N-dimethylaniline | 0.0015 | A | 55 | 15.3 |
| 13 | do | 0.005 | do | 0.00125 | | | B | 58 | 8.7 |
| 14 | do | 0.005 | do | 0.00125 | N,N-diethylaniline | 0.0030 | B | 62 | 24.1 |
| 15 | do | 0.005 | Diethylzinc | 0.0005 | | | B [1] | 65 | 7.6 |
| 16 | do | 0.005 | do | 0.0005 | Triethylenediamine | 0.0015 | B [1] | 52 | 12.8 |
| 17 | do | 0.005 | do | 0.0005 | Tri-n-propylamine | 0.0015 | B [1] | 59 | 17.5 |
| 18 | Aluminum tri-ethoxide. | 0.005 | Diethylmagnesium | 0.00125 | | | B | 47 | 9.4 |
| 19 | do | 0.005 | do | 0.00125 | Triphenylamine | 0.0005 | B [2] | 55 | 12.2 |
| 20 | Aluminum tri-sec.-butoxide. | 0.005 | Dimethylmagnesium | 0.00125 | | | A [3] | 64 | 8.9 |
| 21 | do | 0.005 | do | 0.00125 | Triethylamine | 0.0005 | A [3] | 58 | 21.5 |

[1] The temperature for preparing the catalyst was 60° C.
[2] The tertiary amine was added at the time of catalyst preparation.
[3] 0.07 mole of water was added without using 1,4-dioxane and the polymerization was effected at −5° C. for 24 hours.

EXAMPLE 8

This example shows the effect on polymerization of the temperature for preparing catalysts.

115 g. of ethylene oxide was polymerized in the same manner as in Example 3, except that 0.03 mole of aluminum triisopropoxide was used as the aluminum alkoxide, 0.03 mole of water was used, 10 ml. of 1,4-dioxane was substituted for the isoproapnol, 150 ml. of a mixture of n-heptane and Decalin (the mixin gratio varying according to temperatures desired), 0.003 mole of diethylzinc was used and the time for allowing the mixture to stand was 18 hours, varying the temperature at which the distillation was stopped, i.e. total reflux temperature of n-hetane and Decalin (the mixing ratio varying as shown in Table 7, whereby the results shown in Table 7 were obtained. Further the same procedure as above was repeated, except that 0.015 mole of N,N-dimethylaniline was added, and the results obtained are also shown in Table 7.

TABLE 7

| | | Polymer | | | |
|---|---|---|---|---|---|
| | Catalyst preparation | Without N,N-dimethyl-aniline | | With N,N-dimethyl-aniline | |
| Number | temperature (° C.) | Yield (g.) | [η] | Yield | [η] |
| 1 | Room temperature | 13 | 4.7 | 10 | 5.8 |
| 2 | 43 | 24 | 9.2 | | |
| 3 | 62 | 29 | 8.6 | | |
| 4 | 75 | 29 | 9.1 | 20 | 10.5 |
| 5 | 92 | 58 | 12.6 | 54 | 14.2 |
| 6 | 117 | 64 | 13.1 | 59 | 16.2 |
| 7 | 137 | 65 | 14.9 | 71 | 18.1 |
| 8 | 156 | 75 | 14.7 | 72 | 16.8 |
| 9 | 174 | 97 | 12.9 | 74 | 15.2 |

EXAMPLE 9

A white suspension of a catalyst was prepared in the same manner as in Example 8, except that 0.024 mole of water and various organometallic compounds were used, and then ethylene oxide was polymerized with said catalyst suspension in the same manner as in Example 8, varying the amount of ethylene oxide and the polymerization temperature. The results obtained are as shown in Table 8.

TABLE 8

| | Organometallic compound | | Catalyst preparation temperature (° C.) | Amount of ethylene oxide (g.) | Polymerization time [1] (hr.) | Polymer | | | |
|---|---|---|---|---|---|---|---|---|---|
| | | | | | | Without N,N-dimethylaniline | | With N,N-dimethylaniline | |
| Number | Kind | Amount (mole) | | | | Yield (g.) | [η] | Yield (g.) | [η] |
| 1 | Diethylzinc | 0.0015 | 140 | 100 | 64 | | | 97 | 18.5 |
| 2 | Diethylmagnesium | 0.003 | 128 | 115 | 72 | 35 | 16.2 | 31 | 19.7 |
| 3 | Triethylaluminum | 0.0015 | 132 | 115 | 72 | | | 31 | 24.1 |
| 4 | Diethylzinc | 0.0015 | 125 | 115 | 72 | | | [2] 72 | 22.4 |

[1] For allowing the mixture to stand.
[2] 0.0075 mole of N,N-dimethylaniline was used.

EXAMPLE 10

A white suspension of catalyst was prepared in the same manner as in Example 8, except that a 2-l. four-necked flask, 1.2 l. of a mixture of n-heptane and Decalin, 1.2 moles of aluminum triisopropoxide, 0.72 mole of water, 100 ml. of 1,4-dioxane and 0.12 mole of diethylzinc were used, the partial hydrolyzation product subjected to distillation to remove the alcohol formed as the by-product was heat-treated at 140° C. for one hour before the addition of diethylzinc thereto, and the catalyst preparation temperature was 105° C.

Into a 30-l. enameled reactor with a stirrer, after nitrogen had been substituted for the air therein, were charged 24 l. of n-hexane, the above-mentioned suspension, 0.84 mole of N,N-dimethylaniline and 4 kg. of ethylene oxide in this order, and the resulting mixture was stirred at room temperature for 6 hours and then allowed to stand for 94 hours to subject the ethylene oxide to polymerization, whereby 3.93 kg. of a polymer having an intrinsic viscosity of 22.1 was obtained.

EXAMPLE 11

Polymerization was conducted in the same manner as in Example 8, except that the catalyst preparation temperature was 105° C., equimolar amounts of various tertiary amines were substituted for the N,N-dimethylaniline, 88 g. of ethylene oxide was used and the mixture was stirred for 6 hours and then allowed to stand for 42 hours. The results obtained are as shown in Table 9.

TABLE 9

| Number | Kind of tertiary amine | Polymer Yield (g.) | $[\eta]$ |
|---|---|---|---|
| 1 | N,N-diethylaniline | 65 | 15.1 |
| 2 | Diethyl cyclohexyl amine | 48 | 14.2 |
| 3 | Triethyl amine | 49 | 14.6 |
| 4 | N-methylmorpholine | 55 | 13.9 |

EXAMPLE 12

Into the same reactor as in Example 1, after nitrogen had been substituted for the air therein, were charged 80 ml. of Decalin, 75 ml. of n-heptane, 0.06 mole of aluminum isopropoxide and 0.005 mole of diisopropylamine, and the mixture was heated to 80° C. while being slowly stirred, at which 0.048 mole of water diluted with 50 ml. of 1,4-dioxane was gradually added to the mixture in 2 hours while violently stirring the mixture. The temperature was further raised while continuing stirring to effect reflux for two hours, after which the isopropyl-alcohol formed as the by-product and the diisopropyl amine were distilled off. In order to make the removal of the alcohol and the amine perfect, the distillation was continued for 5 minutes after the temperature reached the boiling point of Decalin.

Ethylene oxide was polymerized with the thus prepared partial hydrolyzate of aluminum triisopropoxide without any tertiary amine in the same manner as in Method A in Example 7 except that the organometallic compound was 0.00125 mole of diethylmagnesium to convert about 50% of the monomer into a polymer having an intrinsic viscosity of 14.8.

EXAMPLE 13

Polymerization was effected in the same manner as in Example 4, except that n-hexane was substituted for the gasoline for rubber and the kerosene, 30 ml. of acetone was used as an additive, the distillation was stopped when the still temperature reached 71° C. (the distillation of the isopropyl alcohol formed as the by-product was 91%), the mixture of the partial hydrolyzate and diethylzinc was heated at 140° C. in a closed system under pressure and 0.2 mole of N,N-dimethylaniline was added together with the catalyst at the time of polymerization to obtain 770 g. of a polymer having an intrinsic viscosity of 18.6.

EXAMPLE 14

Polymerization was conducted in the same manner as in Example 13, except that a mixture of 45 ml. of methanol and 20 ml. of acetone was substituted for the acetone, the solvent was vaporized after the completion of the reaction after the addition of diethylzinc to obtain a white powder and the mixture of ethylene oxide with said white powder catalyst free from N,N-dimethylaniline was subjected to polymerization for 20 hours, whereby 250 g. of a polymer was obtained.

EXAMPLE 15

Into a 100-ml. reactor in which the air had been replaced by nitrogen were charged 40 ml. of n-hexane, the catalyst suspension obtained in the same manner as in Example 8, except that the catalyst preparation temperature was 128° C., in an amount corresponding to 0.005 mole of the aluminum contained therein and 20 ml. of propylene oxide in this order, and the resulting mixture was allowed to stand at room temperature for 30 hours, whereby 5.2 g. of a polymer having an intrinsic viscosity of 6.4 was obtained.

Further, when n-hexane, the partially hydrolyzed aluminum triisopropoxide prepared in the same manner as in Example 8, diethylzinc and propylene oxide were charged into the same reactor as mentioned above without previously reacting the catalytic components, 1.9 g. of a polymer having an intrinsic viscosity of 3.0 was obtained.

EXAMPLE 16

Propylene oxide was polymerized in the same manner as in Method A in Example 7, except that aluminum triisopropoxide and 20 ml. of propylene oxide were used, the polymerization temperature was room temperature, the polymerization time was 72 hours and the organometallic compounds and tertiary amines were varied as shown in Table 10, to obtain the results shown in Table 10, in which the cold-acetone insoluble part is a measure for showing the crystallinity of the produced polymer and was measured at 0° C.

TABLE 10

| | Without tert.-amine | | | | With tert.-amine | | | | |
|---|---|---|---|---|---|---|---|---|---|
| | Organometallic compound | | Polymer | | | Tert.-amine | | Polymer | |
| Number | Kind | Amount (mole) | Yield, percent | $[\eta]$ | Cold-acetone insoluble part, percent | Kind | Amount (mole) | Yield, percent | $[\eta]$ | Cold-acetone insoluble part, percent |
| 1 | Diethylmagnesium (diethyl ether, 0.3 ml.) | 0.00125 | 32 | 5.4 | 32 | N,N-dimethylaniline | 0.0015 | 31 | 8.4 | 28 |
| 2 | do | 0.00125 | | | | Pyridine | 0.0006 | 27 | 7.4 | |
| 3 | {Di-n-butylzinc(n-heptane, 0.3 ml.), Diisopropylmagnesium (diethyl ether, 1 ml.)} | {0.00025, 0.001} | 45 | 6.3 | | N,N-dimethylaniline | 0.0015 | 37 | 9.1 | |

In No. 1 in which no tertiary amine was used, when diethylmagnesium was not used, 24% of the charged monomer was converted into a polymer having an intrinsic viscosity of 2.0. Further, when the suspension of the partial hydrolyzate of aluminum triisopropoxide in n-heptane was not used, no polymer was obtained.

EXAMPLE 17

20 ml. of propylene oxide was subjected to polymerization in the same manner as in Example 7, Method B, in which no tertiary amine was used, except the aluminum triisopropoxide was used as the aluminum alkoxide, 50 ml. of various additives were substituted for the 1,4-dioxane, 0.0005 mole of diethylzinc was used as the organometallic compound, the catalyst preparation temperature was 140° C., the polymerization temperature was room temperature and the polymerization time was 72 hours. The results obtained are as shown in Table 11.

TABLE 11

| | | Polymer | | |
|---|---|---|---|---|
| Number | Additive | Yield, percent | $[\eta]$ | Cold-acetone insoluble part, percent |
| 1 | Methanol | 50 | 8.2 | 38 |
| 2 | Ethanol | 63 | 3.1 | 35 |
| 3 | Isopropanol | 53 | 5.0 | 22 |
| 4 | Acetone | 60 | 5.4 | 25 |
| 5 | 1,4-dioxane | 56 | 4.6 | 27 |

EXAMPLE 18

A white suspension of catalyst was produced in the same manner as in Example 10, except that the heat-treatment temperature of the partially hydrolyzed aluminum triisopropoxide prior to the addition of diethylzinc thereto was varied.

The thus produced suspension was charged into a 100-ml. of glass reactor in an amount corresponding to 0.005 mole of the aluminum contained in the suspension under a nitrogen atmosphere together with 20 ml. of propylene oxide and 20 ml. of n-hexane, and the resulting mixture was allowed to stand at room temperature for 72 hours to obtain the results shown in Table 12.

TABLE 12

| Number | Heat-treatment temperature (° C.) | Polymer Yield, percent | $[\eta]$ | Cold-acetone insoluble part, percent |
|---|---|---|---|---|
| 1 | 60 | 27 | 3.5 | 21 |
| 2 | 100 | 45 | 3.8 | 26 |
| 3 | 140 | 53 | 4.7 | 29 |
| 4 | 180 | 54 | 4.3 | 32 |

EXAMPLE 19

A mixture of 52 g. of ethylene oxide and 5 g. of propylene oxide was subjected to polymerization in the same manner as in Example 3, except that aluminum triisopropoxide was used as the aluminum alkoxide, a mixture of 130 ml. of gasoline for rubber (boiling point: 80°–120° C.) and 30 ml. of kerosene (boiling point: 158°–230° C.) was substituted for 150 ml. of gasoline for rubber, acetone was substituted for the isopropanol, water was used in an amount of 0.081 mole, the distillation was continued until the still temperature reached 140° C., the amount of diethylzinc was 0.0135 mole, and the catalyst preparation temperature under total reflux was 140° C., whereby 40 g. of a copolymer confirmed by infra-red absorption analysis and differential thermal analysis was obtained. This copolymer was soluble in water and had an intrinsic viscosity of 3.3 as measured in aqueous solution at 35° C.

EXAMPLE 20

Polymerization was effected in the same manner as in Example 15, except that a mixture of 15 ml. of propylene oxide and 5 ml. of allyl glycidyl ether was substituted for 20 ml. of propylene oxide, to obtain 3 g. of a polymer which can be vulcanized in a conventional manner.

What is claimed is:

1. A process for producing a high molecular weight polymer of an alkylene oxide, which comprises polymerizing an alkylene oxide having the formula:

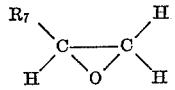

wherein $R_7$ represents a member selected from the group consisting of hydrogen, methyl, ethyl, phenyl, vinyl, chloromethyl, bromomethyl, methoxymethyl, allyloxymethyl, and phenoxymethyl in the presence of a catalyst composition at a temperature of −50° C. to +150° C., said composition consisting essentially of a catalyst prepared by the reaction of (a) a partially hydrolyzed aluminum alkoxide with (b) at least one organometallic compound selected from the group consisting of the compounds represented by the formulas

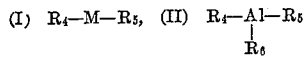

and complexes of (I) and (I), (II) and (II), and (I) and (II) wherein $R_4$, $R_5$ and $R_6$ each represent the same or different saturated hydrocarbon residues having 1 to 6 carbon atoms or a phenyl group and M represents magnesium, zinc, or cadmium, in a proportion of 0.01 to 1.0 mole of said organometallic compound per mole of aluminum contained in said partially hydrolyzed aluminum alkoxide, at a temperature of from 40° C. to 200° C., the catalyst being present in an amount 0.0001 to 0.3 mole of aluminum, contained in said catalyst, per mole of alkylene oxide, said partially hydrolyzed aluminum alkoxide prepared by reacting water with aluminum alkoxide having the formula

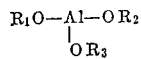

wherein $R_1$, $R_2$ and $R_3$ represent the same or different saturated hydrocarbon residues having 1 to 6 carbon atoms, dissolved or dispersed in an inert liquid medium selected from the group consisting of aromatic and saturated hydrocarbons, ethers, and mixtures thereof in a proportion of 0.1 to 2.5 moles of water per mole of aluminum alkoxide, in the presence of at least one additive selected from the group consisting of aliphatic alcohols of 1 to 6 carbon atoms, saturated aliphatic ketones of 3 to 13 carbon atoms, amines having at least one hydrocarbon residue of 1 to 6 carbon atoms attached to the nitrogen atom and 1,4-dioxane at a temperature of from 0° C. to 200° C. and distilling off the alcohol formed as a by-product and the additive.

2. A process according to claim 1, wherein the additive is distilled off together with the alcohol formed as the by-product in the reaction of the partially hydrolyzed aluminum alkoxide and the water to make the total amount of the remaining additive and alcohol less than equimolar with respect to the starting aluminum alkoxide.

3. A process according to claim 1, wherein the alkylene oxide is ethylene oxide.

4. A process according to claim 3, wherein the aluminum alkoxide is aluminum triisopropoxide and the organometallic compound is diethylmagnesium.

5. A process according to claim 3, wherein the aluminum alkoxide is aluminum triisopropoxide and the organometallic compound is diethylzinc.

6. A process according to claim 3, wherein the aluminum alkoxide is aluminum triisopropoxide and the organometallic compound is triethylaluminum.

7. A process according to claim 1, wherein the alkylene oxide is propylene oxide.

8. A process according to claim 7, wherein the aluminum alkoxide is aluminum triisopropoxide and the organometallic compound is diethylmagnesium.

9. A process according to claim 7, wherein the aluminum alkoxide is aluminum triisopropoxide and the organometallic compound is diethylzinc.

10. A process according to claim 7, wherein the aluminum alkoxide is aluminum triisopropoxide and the organometallic compound is triethylaluminum.

11. A process according to claim 1, wherein ethylene oxide and propylene oxide are copolymerized.

12. A process according to claim 11, wherein the aluminum alkoxide is aluminum triisopropoxide and the organometallic compound is diethylzinc.

13. A process according to claim 1, wherein propylene oxide and allyl glycidyl ether are copolymerized.

14. A process according to claim 13, wherein the aluminum alkoxide is aluminum triisopropoxide and the organometallic compound is diethylzinc.

15. A process according to claim 1, wherein the additive is at least one aliphatic alcohol of 1 to 6 carbon atoms.

16. A process according to claim 1, wherein the additive is acetone.

17. A process according to claim 1, wherein the additive is 1,4-dioxane.

18. A process according to claim 1, wherein the polymerization is conducted in the presence of at least one tertiary amine having at least one hydrocarbon residue having 1 to 6 carbon atoms attached to the nitrogen atom.

19. A process according to claim 18, wherein the alkylene oxide is ethylene oxide.

20. A process according to claim 19, wherein the tertiary amine is triethyl amine.

21. A process according to claim 20, wherein the aluminum alkoxide is aluminum triisopropoxide and the organometallic compound is diethylmagnesium.

22. A process according to claim 20, wherein the aluminum alkoxide is aluminum triisopropoxide and the organometallic compound is diethylzinc.

23. A process according to claim 20, wherein the aluminum alkoxide is aluminum triisopropoxide and the organometallic compound is triethylaluminum.

24. A process according to claim 19, wherein the tertiary amine is N,N-dimethylaniline.

25. A process according to claim 24, wherein the aluminum alkoxide is aluminum triisopropoxide and the organometallic compound is diethylmagnesium.

26. A process according to claim 24, wherein the aluminum alkoxide is aluminum triisopropoxide and the organometallic compound is diethylzinc.

27. A process according to claim 24, wherein the aluminum alkoxide is aluminum triisopropoxide and the organometallic compound is triethylaluminum.

28. A process according to claim 19, wherein the tertiary amine is N,N-diethylaniline.

29. A process according to claim 28, wherein the aluminum alkoxide is aluminum triisopropoxide and the organometallic compound is diethylzinc.

30. A process according to claim 28, wherein the aluminum alkoxide is aluminum triisopropoxide and the organometallic compound is triethylaluminum.

31. A process according to claim 18, wherein the alkylene oxide is propylene oxide.

32. A process according to claim 31, wherein the tertiary amine is triethylamine.

33. A process according to claim 31, wherein the teritary amine is N,N-dimethylaniline.

34. A process according to claim 31, wherein the tertiary amine is N,N-diethylaniline.

35. A process according to claim 18, wherein the additive is at least one aliphatic alcohol of 1 to 6 carbon atoms.

36. A process according to claim 18, wherein the additive is acetone.

37. A process according to claim 18, wherein the additive is 1,4-dioxane.

38. A process according to claim 18, wherein the additive is a saturated aliphatic ketone of 3 to 13 carbon atoms.

39. A process according to claim 18, wherein the additive is an amine having at least 1 hydrocarbon residue of 1 to 6 carbon atoms attached to the nitrogen atom.

40. A process according to claim 1, wherein the additive is a saturated aliphatic ketone of 3 to 13 carbon atoms.

41. A process according to claim 1, wherein the additive is an amine having at least 1 hydrocarbon residue of 1 to 6 carbon atoms attached to the nitrogen atom.

References Cited

UNITED STATES PATENTS

| | | | |
|---|---|---|---|
| 3,384,603 | 5/1968 | Elfers | 260—88.3A |
| 3,427,334 | 2/1969 | Belner | 260—2EPA |
| 3,444,102 | 5/1969 | Ito et al. | 260—2EPA |
| 3,467,624 | 9/1969 | Onishi et al. | 260—88.3A |
| 3,459,685 | 8/1969 | Tomomatsu | 260—88.3A |

HARRY WONG, JR., Primary Examiner

U.S. Cl. X.R.

262—431; 260—29.6, 33.2, 33.6, 47, 88.3